[11] 3,586,419

| [72] | Inventors | Zenji Wakimoto Tokyo; Yoshiyuki Shimizu, Kanagawa-ken, both of, Japan |
|---|---|---|
| [21] | Appl. No. | 792,695 |
| [22] | Filed | Jan. 21, 1969 |
| [45] | Patented | June 22, 1971 |
| [73] | Assignee | Nippon Kogaku K.K. Tokyo, Japan |
| [32] | Priority | Jan. 24, 1968 |
| [33] | | Japan |
| [31] | | 43/3758 |

[54] OPTICAL SYSTEM HAVING AN IMAGE DISTANCE INDEPENDENT OF THE REFRACTIVE INDEX OF THE MEDIUM OF OBJECT SPACE
2 Claims, 4 Drawing Figs.

[52] U.S. Cl........................................... 350/179, 350/230
[51] Int. Cl........................................ G02b 9/04
[50] Field of Search............................................. 350/179, 180, 214, 215, 216, 220, 225, 230

[56] References Cited
UNITED STATES PATENTS

| 1,422,307 | 7/1922 | Salto ............................. | 350/189 UX |
| 3,226,539 | 12/1965 | Rosin et al. .................... | 350/22 UX |
| 3,320,018 | 5/1967 | Pepke............................ | 350/179 UX |
| 3,391,974 | 7/1968 | Ride et al...................... | 350/214 |

FOREIGN PATENTS

| 414,856 | 8/1934 | Great Britain................ | 350/179 |

*Primary Examiner*—John K. Corbin
*Attorney*—Harry G. Shapiro

ABSTRACT: This invention relates to an optical system that has an image distance independent of the refractive index of the object medium, more particularly to an optical system wherein the first surface of the optical system in contact with the object space has a radius of curvature identical with the sphere having the center at the object point on the optical axis in the object space the object distance is kept within a specified range, and thus the image distance can always be kept at a certain specified value regardless of the refractive index of the medium of the object space.

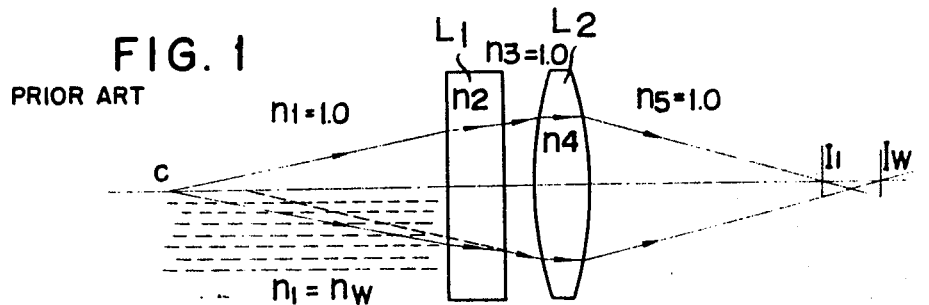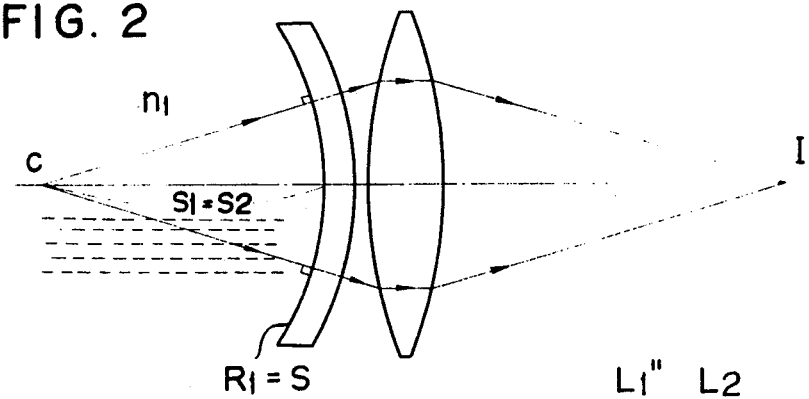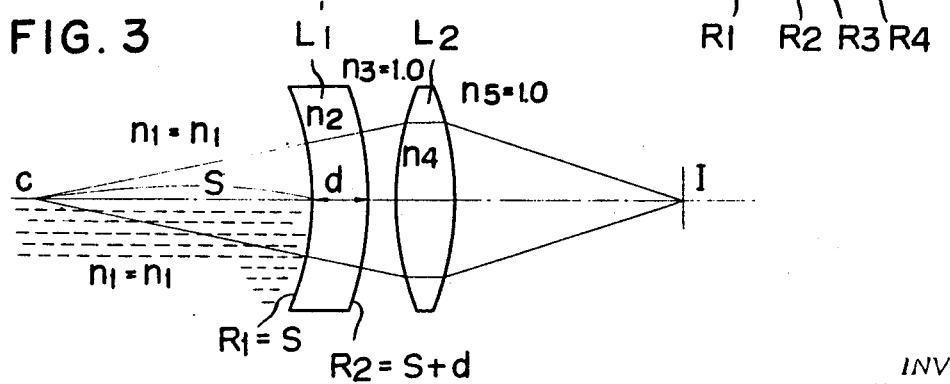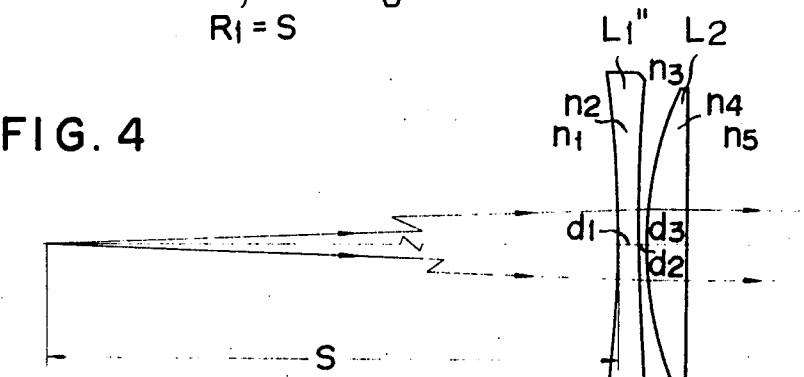

OPTICAL SYSTEM HAVING AN IMAGE DISTANCE INDEPENDENT OF THE REFRACTIVE INDEX OF THE MEDIUM OF OBJECT SPACE

This invention relates to an optical system wherein correction has been made to remove the change in the image surface position of the optical system which is caused by the change in refractive index of the medium of the object space.

So far, the optical instruments used for taking picture or other purposes have been and are still now designed and manufactured tacitly on the assumption that they will be used in the case where the medium of the object space is the air or a vacuum. Consequently, when the refractive index of the object space differs from the refractive index of the medium of the aforementioned object space, for example when the optical instrument is used in water or in other liquids, it is required to expand the aforementioned assumption to bring the refractive index of the medium of the object space into consideration in advance, and simultaneously to introduce corrective means, that vary with the aforementioned change in the refractive index, separately from the optical system. One drawback of the conventional optical systems lies in the absence of compensation for the different or liquid medium of the object space.

It is an object of this invention to provide an optical system free from the aforementioned defects and capable of keeping the image position of an object placed at an arbitrarily determined distance to a specified image distance regardless of the refractive index of the medium of object space.

When making observation or taking pictures of an object in water or in another liquid with an ordinary optical system, the position of the image surface moves when the refractive index of the medium of the object space changes. As a result, means for correcting distance or conversion is required corresponding to the refractive index of the medium of object space. Since the optical system according to this invention is enabled to fix the image surface regardless of the refractive index of the medium of object space, no correction is required for different media of the object space.

Moreover, the optical system according to this invention has an advantage of being able to observe or photograph an object when the object is spreading in two media simultaneously from their boundary surface.

The features of this invention are that the first surface of the optical system contacting with the object space is given a radius of curvature identical with the sphere centered at the object point on the optical axis in the object space, that the object distance is kept within a specified range, and that the image distance can be kept at a constant value regardless of the refractive index of the medium of the object space. The theoretical basis and an embodiment of this invention will be explained in detail referring to the accompanying drawings, in which;

FIG. 1 is a vertical cross section showing the relationships between the object, optical system, and image point for different media of the object space with a conventional plane window type optical system;

FIG. 2 is a vertical cross section showing the relationships between the object, optical system, and image point to explain the theoretical basis of the invention;

FIG. 3 is a vertical cross section showing the relationships between the object, optical system, and image point when the medium of the object space is changed, in the optical system according to this invention, and FIG. 4 is a cross section of an embodiment of a closeup attachment lens of this invention.

The most general medium of an object space is water or sea water except for air. Underwater photographic lenses and periscopes are the optical systems that have been used in such a liquids. Normally, these optical systems contact with object space at a window of parallel plane glass, and their interior is kept airtight. When making the image of an object in object space which is at a definite distance from such optical system, the image distance varies with the refractive index of the medium of the object space. FIG. 1 is a vertical cross section showing the relationships between the object, optical system, and image point when the medium of the object space has changed at a plane window type optical system, and in which $L_1$ shows a parallel plane window glass and $L_2$ a lens shown with a single lens to simplify explanation; $n_1$ is the refractive index of the medium of the object space, $n_2$ a refractive index of the parallel plane glass $L_1$, $n_3$ the refractive index of the first air space, $n_4$ the refractive index of the lens $L_2$, and $n_5$ the refractive index of the medium of image space, which is in this case is air; C represents an object point, $I_1$ an image point when the medium of the object space is air, and $Iw$ an image point when the medium of the object space is water. The medium of the object space above the centerline is air and that below the center line is water. In FIG. 1, the image of the object point C is formed at $I_1$ when the object space is air and at $Iw$ when the object space is water. Since the position of $Iw$, the image point formed when the object space is water, is the same as the image position of an object point in position $1/nw$ (where $nw$ represents the refractive index of water) of the object distance when the object space is air, these two points do not coincide as long as the object point is at definite distance from the lens system. Therefore it was necessary either to advance or retreat the lens system or to move the image plane for focusing in response to the variation of refractive index of the medium of object space such as water and air.

The theoretical basis of this invention will be explained in detail referring to FIG. 2, in which C is an object point and I an image point. Generally, the light emerging from a point C on the optical axis in the object space of any lens system passes through the first surface of the optical system and undergoes refraction. In this case, if the refractive index of the medium of object space varies, the angle of refraction of the aforementioned light produced at the aforementioned first surface also varies, resulting in the change in the light path that follows.

However, when the first surface of the optical system coincides with a sphere centering at the aforementioned object point C, the light emerging from the object point C is incident upon the first surface perpendicularly and as a result advances without undergoing any refraction. Assuming that $R_1$ is the radius of curvature of the first surface of the optical system, $n_1$ the refractive index of the medium of the first object space, $S_1$ the object distance in case of medium of the first object space, $n_2$ the refractive index of the medium of the second object space, $S_2$ the object distance in case of the medium of the second object world, and Q the Abbe's zero invariant with reference to refraction and put then,
$$Q = n_1(1/R_1 - 1/S_1) = n_2(1/R_1 - 1/S_2)$$
$$n_1/S_1 - n_2/S_2 = (n_1 - n_2)/R_1$$

now, place $S_1 = S_2$, then
$$(n_1 - n_2)/S_2 = (n_1 - n_2)/R_1$$
$$S_2 = R_1$$

This shows clearly that the aforementioned state is retained even when the refractive index of the medium of the object space is changed. Consequently, no change occurs in the light path after the first surface. Therefore, by giving an appropriate refractive power to a portion after the second surface of the aforementioned optical system to form the image of the object point C at a specified position, it is possible to obtain an optical system having a specified object distance and image distance which are not influenced by the refractive power of the medium of the object space.

FIG. 3 is a vertical cross section showing the relationships between the object, optical system, and image point for the optical system according to this invention when the medium of the object space differs. Here $L_1$ is a lens in contact with the object space, $L_2$ is an optical system used to form the image in combination with the second surface of the lens $L'_1$ which is expressed with a single lens to simplify explanation; S is an object distance in air, $R_1$ a radius of curvature of the first surface of the optical system contacting with object space, C an object point, I the image point, $n_1$ the refractive index of the medium of the object space, $n_2$ the refractive index of the first lens $L'_1$, $n_3$ the refractive index of the first air space, $n_4$ the refractive index of the lens $L_2$, and $n_5$ the refractive index of the image space. In FIG. 3 are shown the relationships of light paths, the case in which $n_1 = n_1$ is shown above the centerline and the case in which $n_1 = n_1'$ below the centerline. Since the radius of curvature, $R_1$ of the first surface of the optical system is made equal to the object distance S, the image plane coincides even when the medium of the object space differs. Furthermore, when installing a window to a readymade optical system for airtightness' sake, it is sufficient to make the first surface as above, and to make the radius of curvature $R_2$ of the second surface equal to the sum of the thickness d of the window glass and the object distance S. In this case the positions of object point and image point do not change even when the window is removed in the air. Normally, in underwater photography, there is no case of taking pictures of an object at infinity. Therefore, by adopting the most frequently used definite distances of 2 to 3 meters as the value of S, it is possible to make the distance scales for air and water coincide with each other and even when the distance of the object to be photographed departs from the aforementioned object distance S, the difference between two images is very little compared with the case of plane window and can be regarded to coincide within the range of depth of focus. This condition can be applied to the case where a concave window is to be installed on the lens in air or, on the contrary, to the case where a lens, designed exclusively for use in the water by combining the window to form one lens, is to be used in air. In such a lens system, since the image planes of an object in both media coincide, when an object lies in both media continuously, it is possible to obtain the image of the whole object on one plane if the optical axis is placed on the boundary surface. This is an advantage or result that has never been attained with conventional optical systems, and serves much in observing or photographing an object floating on the boundary surface or lying in both media.

This invention will now be illustrated by one example. In order to apply this invention strictly, it is necessary to determine the object distance in advance. As an example, an attachment lens according to this invention used for closeup photography will be shown.

FIG. 4 is an attachment lens used mainly for underwater photography. Its purpose is to be combined with the camera lens, to take pictures on the focal plane of the said camera lens. The lens system consists of a concave lens $L_1''$ having its concave surface facing the object space and a plane-convex lens $L_2$ having a plane on the image space side. In the drawing, C is the object point and S the object distance. The radius of curvature of the first surface is identical with the object distance S, and the front focal point comes on the object plane. For this reason, the light rays emerging from the object plane become parallel light rays after passing through the lens system and form an image by the main lens system (not shown in the drawing) on the focal plane of the lens system. Since the light rays are made parallel in between the both lens systems the medium between the both lens systems can be the same as the medium of the object space or can be the air after making the whole system airtight.

The particulars for the lens system for the case in which the object distances S=100.0 are as follows:

| | S = 100.0 | $n_1$ = arbitrary | |
|---|---|---|---|
| $R_1 = -100.0$ | $d_1 = 1.700$ | $n_2 = 1.62004$ | $Vd_1 = 36.3$ |
| $R_2 = +141.096$ | $d_2 = 0.127$ | $n_3 = 1.0$ | |
| $R_3 = +25.499$ | $d_3 = 4.250$ | $n_4 = 1.5168$ | $Vd_4 = 64.2$ |
| $R_4 = \infty$ | | $n_5$ = arbitrary | |

Where
  R: radius of curvature
  d: thickness of the lens, and spacing between lenses
  n: refractive index of the glass used
  Vd: Abbe's number for the glass used So far explanation has been given mainly using water as the medium. In practice, however, the same applies to other liquids such as oil, and the kinds of media have no influence on this system. This invention has been explained using an attachment lens for closeup photography as an example. However, as was partly mentioned in the explanation of the aforementioned FIG. 2 and 3, this invention can of course be used as a special taking lens, as a taking lens being combined into one with window glass, and as a combination of separate window glass and a readymade taking lens.

We claim:

1. An optical system for viewing an object in a liquid medium from a medium of air comprising a first lens having a concave surface adapted to face an object in a liquid medium, the radius of curvature of the concave surface being not more than approximately (3) meters, and a second lens positioned behind the first lens, said second lens having a convex side disposed adjacent the first lens, whereby due to the normal incidence of light on said concave surface the image distance is maintained at a given position irrespective of the refractive index of the medium of the object space.

2. An optical system according to claim 1, wherein the first lens has the following numerical data:

| | S = 100.0 | $n_1$ = arbitrary | |
|---|---|---|---|
| $R_1 = -100.0$ | $d_1 = 1.700$ | $n_2 = 1.62004$ | $Vd_1 = 36.3$ |
| $R_2 = +141.096$ | $d_2 = 0.127$ | $n_3 = 1.0$ | |
| $R_3 = +25.499$ | $d_3 = 4.250$ | $n_4 = 1.5168$ | $Vd_4 = 64.2$ |
| $R_4 = \infty$ | | $n_5$ = arbitrary | | where S is an object distance, $R_1$ and $R_2$ are radii of curvature of the first lens, $R_3$ and $R_4$ are radii of curvature of the second lens as viewed from the object side; $d_1$ and $d_2$ are thicknesses of the first and second lenses and $d_3$ is the air spacing between the two lenses; $n_1$ is the refractive index of the medium, $n_2$ and $n_4$ are the refractive indexes of helium d-line of the first and second lenses, $n_3$ is the refractive index of the air spacing, and $n_5$ is the refractive index of a medium between the first lens and the second lens; and $Vd_1$ and $Vd_4$ are Abbe numbers of the first and second lenses, respectively.